United States Patent [19]

Kuts

[11] 3,762,259

[45] Oct. 2, 1973

[54] FABRIC CUTTING APPARATUS

[75] Inventor: Mathew Kuts, Akron, Ohio

[73] Assignee: The B. F. Goodrich Company, New York, N.Y.

[22] Filed: Jan. 3, 1972

[21] Appl. No.: 214,605

[52] U.S. Cl. .................... 83/471.3, 83/482, 83/488, 83/508, 83/578, 83/676

[51] Int. Cl. ....................... B26d 1/20, B23d 19/02

[58] Field of Search ...... 83/483–489, 614, 578, 582, 471.3, 477, 477.1, 676, 482, 508

[56] References Cited
UNITED STATES PATENTS

| | | | |
|---|---|---|---|
| 3,686,991 | 8/1972 | Fujimoto | 83/582 |
| 245,151 | 8/1881 | Fowler | 83/487 X |
| 342,127 | 5/1886 | Panyard | 83/489 X |
| 3,207,019 | 9/1965 | Vanzo et al. | 83/508 X |
| 2,605,840 | 8/1952 | Parker | 83/483 X |
| 1,888,754 | 11/1932 | Alexander et al. | 83/488 X |
| 2,638,856 | 5/1953 | Hubbard | 83/473 X |
| 1,975,219 | 10/1934 | Alexander et al. | 83/676 X |
| 1,914,528 | 6/1933 | Reid | 83/508 X |

FOREIGN PATENTS OR APPLICATIONS 243,082  2/1963  Australia ............................. 83/487

Primary Examiner—J. M. Meister
Attorney—Joseph Januszkiewicz et al.

[57] ABSTRACT

Bias cutting of rubberized fabric material wherein a carriage is reciprocated on a support frame, which frame is angularly adjustable to determine the bias angle of cut. The carriage supports a pair of spaced cutters that are alternatively operative to perform a shearing cut depending on the direction of movement of the carriage. Such carriage supports a motor whose output is connected to the respective cutters. Each cutter has a plurality of circumferentially spaced linear cutting edges. A spring biases the cutters into shearing engagement with a cutter guide over which the fabric material is to travel and is positioned for cutting. The cutting action of the cutters is a shearing action as the cutters and carriage are reciprocated across the support frame.

12 Claims, 8 Drawing Figures

FABRIC CUTTING APPARATUS

BACKGROUND OF THE INVENTION

This invention relates to pneumatic tire manufacture and more particularly to a bias cutting apparatus for cutting ply stock material which is employed in the construction and manufacture of pneumatic tires.

In the manufacture of pneumatic tires, one of the principal members used to build the basic tire carcass is a thin sheet of uncured rubber-like material known as a fabric, building ply or building ply stock. In the manufacture of such ply stock, parallel fabric cords are passed through a pair of rolls in cooperation with calendering rolls which work and calendar unvulcanized rubber onto the parallel cords as they pass through the calendering rolls to form a continuous sheet with the parallel fabric cords embedded therein. Thereafter, such sheet material is bias cut into sections, which sections are then spliced end to end to give a building ply or building ply stock with cords therein located at a desired bias angle relative to the longitudinal center line of the building ply. The layers of fabric are applied to a tire building drum in such a manner that cord members of overlapping plies crisscross with respect to the cord members above or below. The tire beads are then set against the ends of the plies and the plies turned thereover. Additional plies, chafer strips, sidewall strip, breakers, overhead belts and a tread ply may be applied in varying orders, and stitched thereto. Such carcass is substantially a flat band, wherein the angle is measured between the cords and the circumferential line around the crown of the tire in the case of pneumatic passenger tires is approximately sixty degrees or variations thereon. After the removal of such green tire, the tire is given a toroidal shape during vulcanization or on a second machine prior to vulcanization, wherein the angle (of the 60° example) after vulcanization is now thirty to thirty-five degrees depending on many factors including drum set. The described process has generally referred to tires manufactured from fabric, however, the present invention is also directed to building plies which use non-extensible cord materials such as nylon and wire. In the processing of building plies containing wire, processing has been difficult because of the inherent difficulty in cutting wire, which cutting is particularly compounded by the very low bias angle cutting on such stock wherein the cutters tend to push and displace the wire ends, which action distorts the stock.

In bias cutting rubberized cloth fabric, the conventional method of cutting is to use a pair of fingers that lift the fabric away from the conveyor belt on which it travels, so that a rapidly rotating cutter disc above the fingers cuts the fabric. The application of this apparatus and method to rubberized wire fabric is difficult and unsatisfactory. Where the speed of rotation of the rotating cutter is greater than the linear speed of the cutter as it moves across the material to be cut, then there is a tendency to gather the material due to the action of the rapidly rotating cutter; whereas if the rotational speed is less than the linear speed, there is a tendency to push the fabric material ahead of the cutter. The rotating cutter of the present invention has a plurality of circumferentially spaced cutting edges which are linear, giving the cutter a downwardly cutting or shearing action in cooperation with a support cutting edge as opposed to a rolling action of a circular cutter.

In having a pair of circular cutters with overlapping edges operating on wire fabric, the linear speed of movement of the cutters must be matched to the rotating speed of the cutters to facilitate a cutting action, whereas the cutting action of the blade of the instant invention is a shearing action and it is not critical what speed the cutter would be rotated at since the shearing action is not dependent on speed. The cutting action of the instant invention is like that of a pair of tin snips wherein the cutting action is downward as it moves across the material to be cut. Further, the instant invention utilizes a pair of adjacent cutters to increase production.

SUMMARY OF THE INVENTION

The present invention contemplates an apparatus that utilizes a carriage which is mounted on a support frame for reciprocal movement on a guideway. The support frame is adjustable to determine the bias angle of the cut of the material. The carriage supports a pair of cutter support members, each of which journals for rotation a support shaft which has a rotating cutter on one side thereof and a biasing spring on the other side which biases the cutter into engagement with the cutting edge of an anvil over which the fabric material is positioned and is to be cut. The biasing action of the spring facilitates the shearing action of the cutters. One of the cutters does the cutting when the carriage is moved across the material in a first direction while the other cutter does the cutting when the carriage is reversed in its travel across the material thereby performing a cutting action on each pass of the carriage.

DETAILED DESCRIPTION

Figure 1:
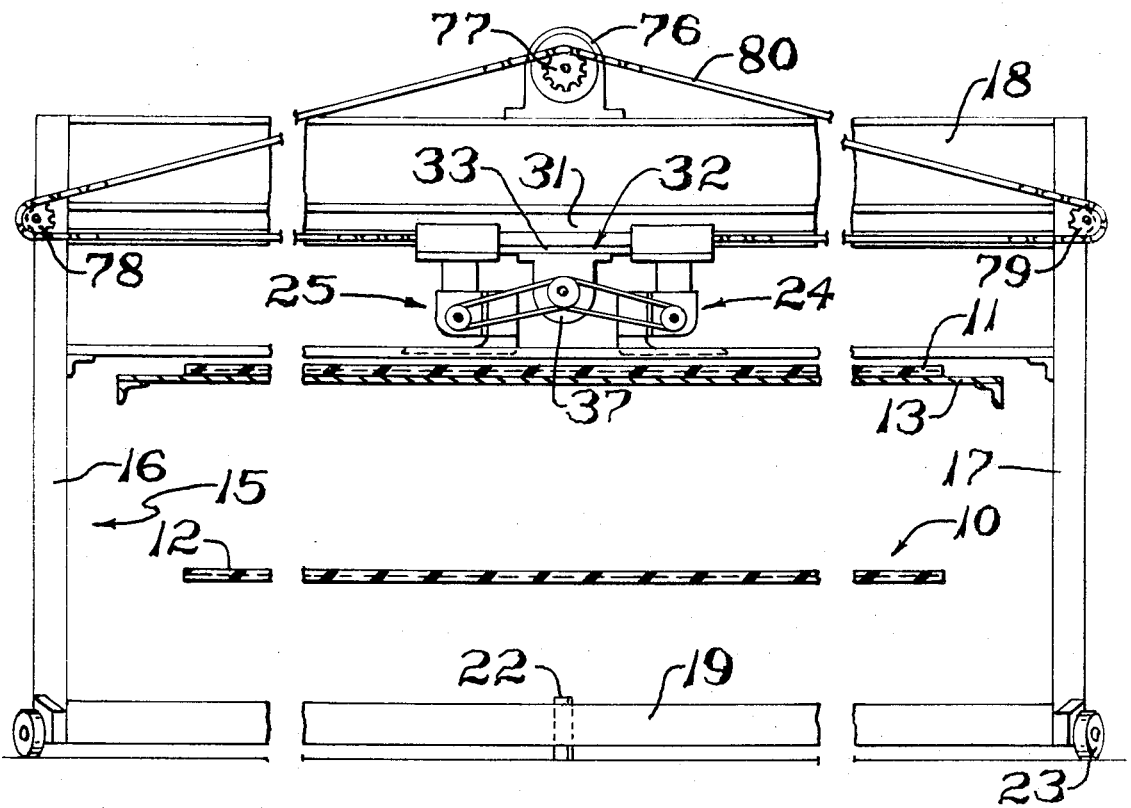
FIG. 1 is a front elevational view of the bias cutting apparatus with only portions of the conveyor shown.
Figure 3:
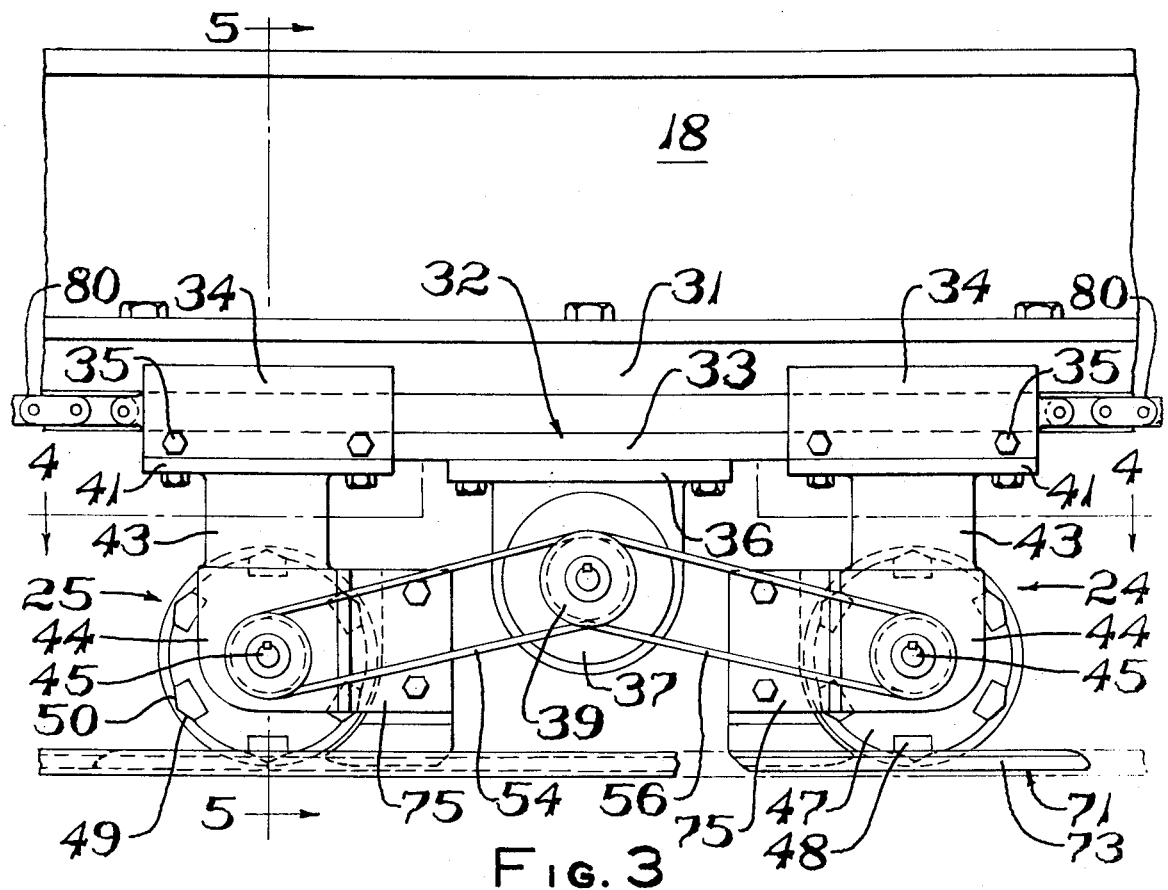
FIG. 3 is an enlarged front elevational view of the carriage and cutting means of the bias cutting apparatus.
Figure 5:
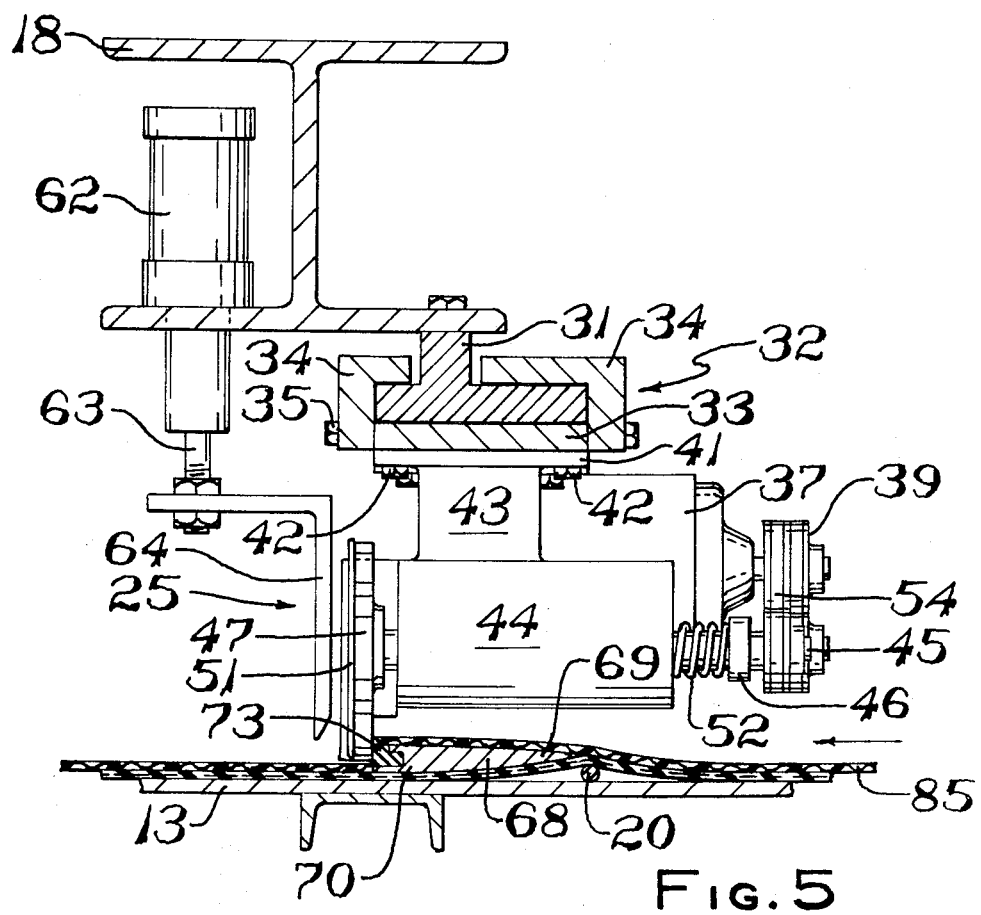
FIG. 5 is a fragmentary cross-sectional view of the carriage on the guideway, with the cutter support member and fabric clamp means.

Referring to the drawings wherein like reference characters designate like or corresponding parts throughout the several views, there is shown in FIG. 1 an endless conveyor belt 10 that is supported at spaced ends thereof by suitable rollers driven in the manner old and well known in the art. Conveyor belt 10 has an upper conveying run 11 and a lower return run 12. Suitable guide and support means are provided to guide the belt in its travel, including an upper plate 13 (FIG. 5) to support upper run 11. Supporting framework 15 shown generally in FIG. 1 has a pair of spaced upwardly extending support members 16 and 17 with suitable cross supports including an upper cross support or I-beam 18 and a lower cross support 19. Lower support 19 has a pivot mounting 22 at its intermediate portion suitably journaled in the floor of the installation, about which the support framework 15 can be pivotally adjusted. A plurality of spaced rollers 23 are suitably mounted on respective lower end portions of supporting framework 15 to facilitate the angular adjustment of the supporting frame 15 and the bias cutting apparatus to be described. Cross support 18 extends across the entire width of the bias cutting apparatus and, as shown in FIG. 5, is substantially I shaped, having secured to its lowermost portion an inverted T-shaped guide bar 31. Mounted for reciprocal movement on guide bar 31 is a carriage means 32 which includes an elongated bar 33 whose respective outer end portions are suitably secured thereto by pairs of L-shaped clamp members 34. The clamp members 34, as shown in FIGS. 3 and 5, are secured to the elongated bar 33 as by studs 35. Suitably secured to the intermediate lower portion of bar 33 is a plate 36 (FIG. 3) which supports a motor 37 having an output sheave 39. Suitably secured to the respective lower outer end portions of bar 33 are plate members 41 as by bolts 42. Each such plate members 41 support cutter units 24 and 25, however, only one such unit will be described with the respective numerals indicating like parts in the respective units. Extending downwardly from plate member 41 is a boss 43 supporting a housing 44. Housing 44 journals for rotation a shaft 45 which has an enlarged portion 46 on one end thereof. The other end portion of shaft 45 supports for rotation therewith a circular cutter 47 having a plurality of circumferentially spaced cutter inserts 48 with linear cutting edges 49 and 50. Integral with cutter 47 is a circular disc 51 that is slightly larger in diameter than cutter disc 47. Encompassing the forward portion of shaft 45 between enlarged portion 46 and housing 44 is a spring 52 which biases shaft 45 rightwardly as shown in FIG. 5 toward the forward portion of the cutting apparatus, for a purpose to be described. Mounted on the forward portion of shaft 45 is a pulley 53 which receives a pulley belt 54. Belt 54 trained about pulley 53 and sheave 39 transfers the output from motor 37 to shaft 45 and cutter disc 47. Cutter unit 24, as previously stated, is similar to cutter unit 25 except that the rearward portion of the shaft thereon supports a pulley 55 which transmits power to its cutter disc 47 by a pulley belt 56 which is trained about pulley 55 and sheave 39.

Figure 6:
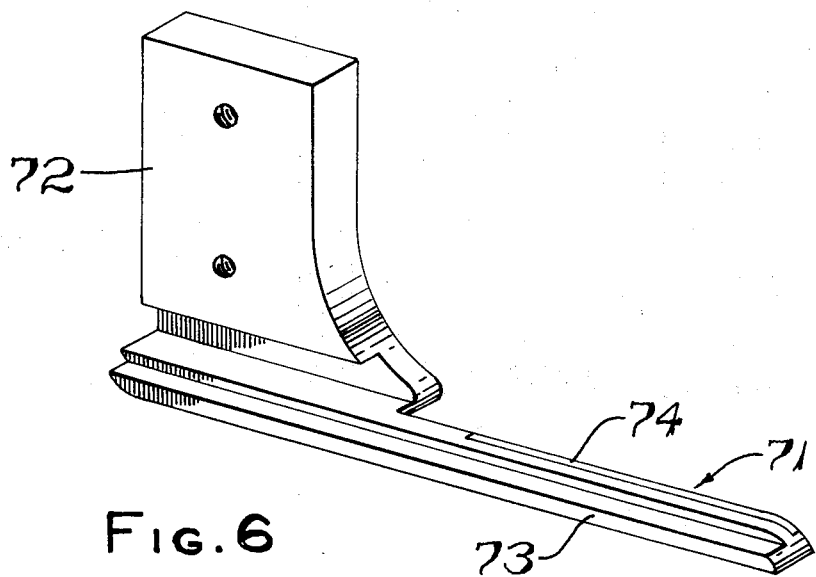
FIG. 6 is an isometric view of the anvil and the shoe.

Suitably secured to the rearward portion of I-beam 18 are a plurality of pneumatic cylinders 62 having their piston rods 63 suitably connected to L-shaped clamp members 64 which are selectively operable to clamp fabric stock to the conveyor belt to facilitate the cutting action to be described. Extending laterally between vertical support members 16 and 17 is a guide bar 68 which has a leading edge 69 and a trailing edge 70, which trailing edge is suitably recessed to provide a guideway for an anvil 71 as depicted by FIG. 6. Anvil 71 is supported by a rectangular shaped block or carrier member 72. The anvil is recessed to provide a reduced portion 73 which is slidably received by the recess in the guide bar 68 to facilitate the reciprocal movement of the anvil. The one side of anvil 71 has an insert 74 which may be of carbide material to facilitate the cutting action to be described. Such anvil 71 may be secured to the housing of motor 37 and extending laterally in both directions from the center thereof and is cooperative with cutter units 24 and 25 to perform the shearing action on the fabrics.

Figure 4:
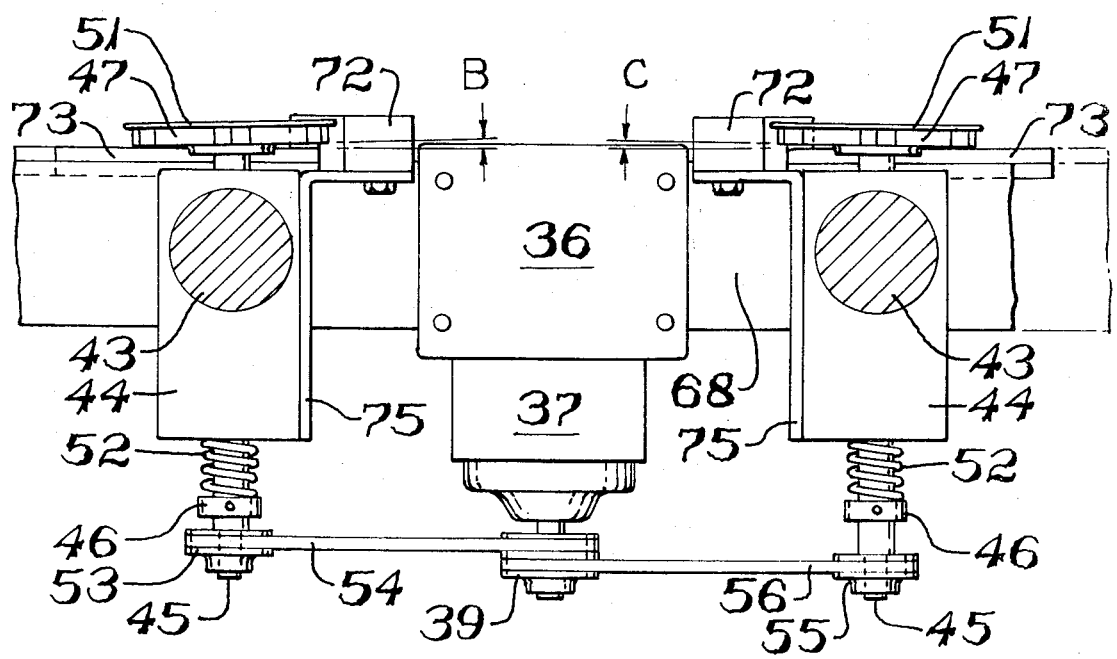
FIG. 4 is a plan view of the cutters, cutter support members, anvils and shoes.
Figure 7:
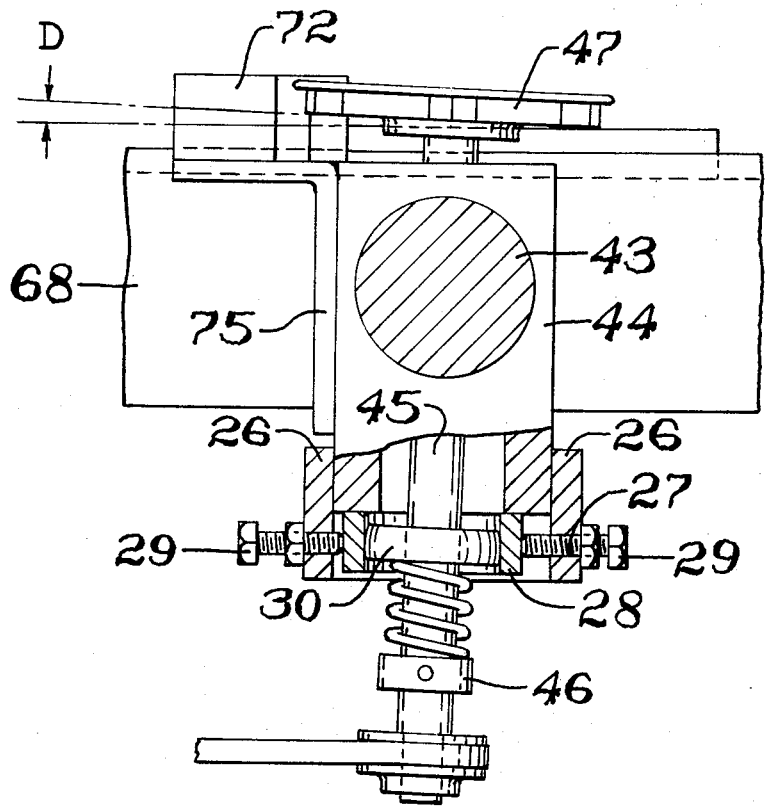
FIG. 7 is a plan view of the cutter support with a portion shown in cross section.

Housing 44 has an L-shaped bracket 75 secured thereto with its one leg portion supporting the carrier member 72 along with anvil 71. Thus, as carriage 32 is moved along guide bar 31, anvil 71 is moved along the recess in the trailing edge 70 of the guide plate 68. Cutter units 24 and 25, as mentioned previously are identical in construction, however, they have their respective anvils directed outwardly away from each other as seen in FIG. 3. This is provided to permit the cutting in either direction of travel of the carriage 32. The respective cutters 47 make an acute angle with their respective anvils as shown in FIG. 4, which angles are in the magnitude of 2 to 3 thousandths of an inch as indicated by A and B in such Figure. FIG. 7 shows this angle as D and is exaggerated for purposes of illustration only.

The intermediate upper portion of I-beam 18, as shown in FIG. 1, supports a motor 76 having its output connected to sprocket 77. Mounted on the respective support members 16 and 17 are sprockets 78 and 79 about which are trained a sprocket chain 80 which is also directed about sprocket 77. The respective ends of sprocket chain 80 are secured to bosses on the carriage 32 such that energization of motor 76 will reciprocate carriage 32 in a first direction and after engaging suitable limit switches, such motor 75 is reversed to move the carriage 32 in a second direction, opposite to said first direction. The reciprocation of such carriage 32 is controlled by suitable limit switches.

Figure 2:
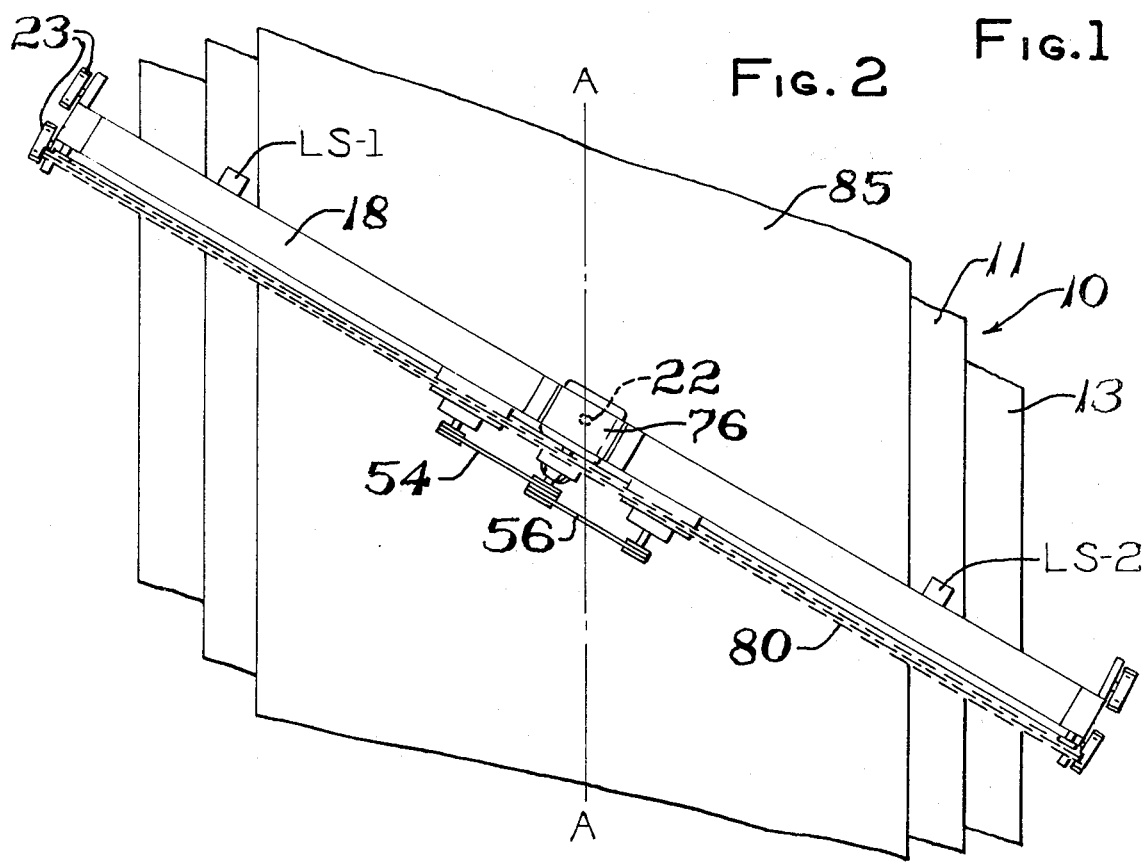
FIG. 2 is a fragmentary plan view of a bias cutting apparatus with a portion of the conveyor shown.

In the operation of the apparatus described assume that line AA in FIG. 2 represents the longitudinal center line of the endless conveyor 10 and a fabric 85 is being moved therewith. Such suporting frame 15 is secured in any suitable manner to the floor or base to prevent movement about the pivotal means 22. Endless conveyor belt 10 is intermittently energized to move a preselected amount of fabric 85 past the guide plate 68 in a manner old and well known in the art. During such movement of the belt 10, the fabric, with wire strands thereto, is moved up and over the guide plate 68 facilitated by the leading edge 69 thereof as well as a rod 20 closely adjacent to the guide plate 68. Upon stopping of the conveyor belt 10, cylinder 62 is energized for thin stock, however, for relatively thick ply stock which has wire cords embedded therein, there is no necessity to energize cylinder 62. Motor 76 is then energized to move carriage 32 across the guide bar 31 while simultaneously therewith motor 37 is energized which rotates the respective cutters 47 at a higher speed through the respective output shafts 45 and belts 54 and 56 which transfer their output to the cutter discs 47, which discs rotate in the same direction. The cutting edges of the cutter 47 of cutter unit 24 makes a slight angle with respect to the cutting edge of anvil 71. As the carriage 32 is reciprocated laterally across the fabric, cutter 47 of unit 24 in cooperation with the anvil 71 moves therewith and performs a shearing operation upon the fabric and the wire strands therein. As the cutter disc 47, of unit 24, rotates, spring 52 biases the respective cutting edges as they rotate into a cooperative relationship with the anvil into a shearing action with the fabric and, wherein such inclination of the cutting edge of the cutter performs a snipping action which is a downward movement of the linear cutting edge across the fabric with the wire cords embedded therein, which will cut effectively without displacing the wire strands or cord.

The purpose of the spring is to maintain contact between the cutting edge and the anvil only at the point of actual cutting and not across the entire cutter and the anvil. Upon completion of the cut, motors 76 and 37 are de-energized. The motor which moves the conveyor belt 10 is then energized to move the fabric 85 a predetermined distance for a second successive cut. Motors 76 and 37 are then reversed in their direction of rotation which thereby moves the carriage 32 across the fabric while cutter 47 of cutter unit 25 performs its cutting action rather than cutter 47 of cutter unit 24. However, in this instance cutter 47 of unit 25 is inclined so its leading edges contact the anvil, thus the cutters 47 of units 24 and 25 are inclined in reverse directions as indicated in FIG. 4 as B and C. Since the respective cutters 47 of units 24 and 25 rotate in the same direction only the leading cutter performs the cutting operation while the trailing cutter follows.

Suitable limit switches LS-1 and LS-2 are mounted on the I-beam 18 for controlling the timed sequence of rotation of cutters 47 in cutter units 24 and 25. Similar limit switches may be employed in controlling the reciprocation of the carriage.

Figure 8:
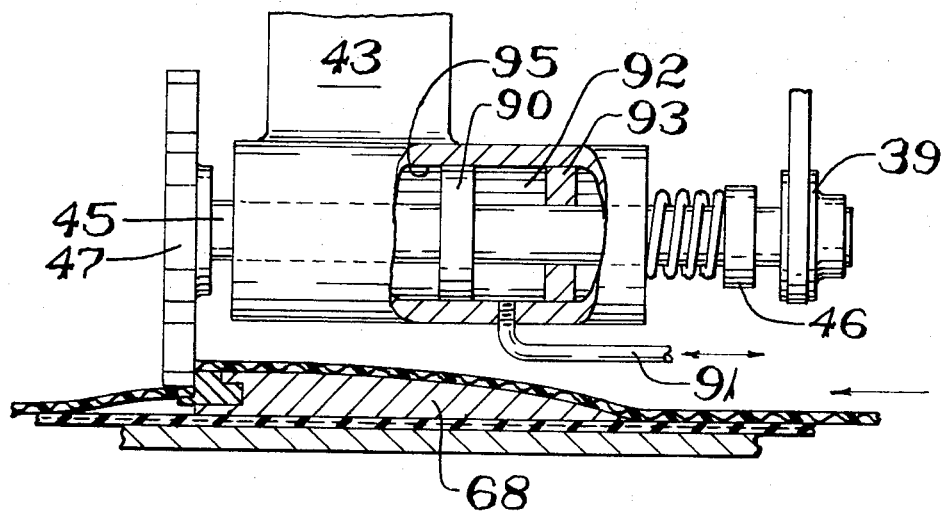
FIG. 8 is a fragmentary side elevational view of the cutter support, with a portion shown in cross section.

A modification of the apparatus described is to have the housing 44 suitably bored to receive a piston 90 (FIG. 8) that is integral with shaft 45. A suitably controlled pneumatic conduit 91 is connected to the chamber 92 defined by the piston 90 and an annular disc 93 that is suitably secured to the inner wall of bore 95 of housing 44. Herein, the purpose is to pressurize the chamber 92 to move the cutter 47 that is trailing outwardly away from the anvil to assure noninterference in the cutting action when desired.

A further modification is that of the cutter support housing 44 which is shown in FIG. 7. The forwardly most disposed portion of housing 44 has a pair of laterally spaced brackets 66 suitably secured thereto. Each bracket 26 has a threaded bore 27 extending therethrough. The forwardly disposed portion of housing 44 between brackets 26—26 is suitably recessed to receive a bearing housing 28, shown in cross-section in FIG. 7. Suitably received by the respective threaded bores 27—27 are set screws 29—29, which provide for a micro adjustment of the bearing housing 28 with respect to the housing 44. Suitably secured to the inner periphery of bearing housing 28 is a bearing unit 30 which journals for rotation the one end portion of shaft 45. Through the manipulation of the respective threaded screws 29—29, shaft 45 is adjusted to position the cutter 47 on the rearward most portion of such shaft 45 to provide for a micro adjustment of acute angle D that cutter 47 makes with anvil 71 as well as the clearance space on the backside of the cutter 47.

Various modifications are contemplated and may obviously be resorted to by those skilled in the art without departing from the described invention, as hereinafter defined by the appended claims, as only a preferred embodiment thereof has been disclosed.

I claim:

1. A bias cutting apparatus for cutting rubberized fabric comprising a support frame, a carriage mounted on said support frame for reciprocal movement, power operated means connected to said carriage for reciprocating said carriage, a pair of laterally spaced cutter means journaled on said carriage for rotation thereon, drive means mounted on said carriage operatively connected to said cutter means for rotating each of said cutter means, a guide plate secured to the lower portion of said support frame over which fabric is moved, anvil means secured to said carriage for movement therewith, said anvil means guided for reciprocal movement on said guide plate, said anvil means having a linear cutting edge, and biasing means connected to each of said cutter means to bias a portion of the cutting edges of each of said cutter means into shearing contact with said linear cutting edge of said anvil means.

2. A bias cutting apparatus as set forth in claim 1 wherein each of said cutter means are rotated in the same direction, and control means mounted on said support frame for selectively rotating said drive means clockwise and counterclockwise.

3. A bias cutting apparatus as set forth in claim 2 wherein each of said cutter means is adjustably mounted on said carriage for adjusting the acute angle said cutting means makes with said anvil means.

4. A bias cutting apparatus as set forth in claim 3 wherein each of said cutter means has a plurality of circumferentially spaced cutting edges that are cooperative with said anvil means to perform a shearing action on the fabric, and the plane of said cutting edges of each cutter means makes an acute angle with said cutting edge of said anvil means.

5. A bias cutting apparatus as set forth in claim 4 wherein at least one of the cutting edges of one of said cutter means has a portion thereof in cooperating contact with said linear cutting edge of said anvil at all times and making an acute angle therewith.

6. A bias cutting apparatus as set forth in claim 5 wherein control means are connected to each of said cutter means for moving said cutters selectively in an axial direction away from said anvil means to maintain one or the other of said cutter means out of contact with said anvil.

7. A bias cutting apparatus as set forth in claim 6 wherein clamp means are operatively connected to said support frame for clamping ply stock to be cut by said cutter means.

8. A bias cutting apparatus for cutting rubberized fabric with wire strands therein comprising a support frame, a pair of spaced rollers mounted on said support frame, an endless conveyor belt trained over said rollers, said belt having an upper conveying run and a lower return run, said upper conveying run having a longitudinal center line lying in a vertical plane that is normal to the axis of rotation of said spaced rollers, said support frame having a pivot means for pivotal adjustment of said support frame, guideways mounted on said support frame, a carriage mounted on said guideways for reciprocal movement thereon, drive means connected to said carriage for reciprocating said carriage, a guide bar mounted on said support frame for pivotal movement therewith, said guide bar having a leading edge and a trailing edge, said guide bar tapering to a point from said trailing edge to said leading edge, anvil means guided for reciprocal movement on said guide bar, said anvil having a linear cutting edge, said anvil means connected to said carriage for movement therewith, said carriage having a pair of laterally spaced downwardly extending cutter support members, a shaft journaled in each of said cutter support members for rotation and limited axial linear movement in a direction generally parallel to said longitudinal center line, motor drive means connected to said shafts for rotating said shafts simultaneously clockwise or counterclockwise, one end of each of said shafts supporting cutter means, biasing means mounted on the other end of each of said shafts for biasing that portion of said cutter means adjacent to said trailing edge into contact with said trailing edge, first vertical and second vertical planes containing each of said cutter means respectively making acute angles with a third vertical plane that contains said linear cutting edge of said anvil, and said third plane is normal to said upper conveying run.

9. A bias cutting apparatus as set forth in claim 8 wherein each of said cutter means has a plurality of circumferentially spaced cutting edges that are linear, and said biasing means maintains contact with at least one of said cutting edges of each of said cutter means.

10. A bias cutting apparatus for cutting rubberized fabric comprising a support frame, mounting means for pivoting said support frame about a central pivot point for swinging said support frame to predetermined positions, guideway means mounted on said support frame, carriage means mounted on said guideway for reciprocal movement thereon, a pair of cutter supports mounted on said carriage for movement therewith, cutter means mounted on each of said cutter supports for rotation thereon, spring means operatively engaging each of said cutter means for biasing each of said cutter means toward said cutter supports, motive means connected to each of said cutter means for rotating said cutter means, a guide plate mounted on said support frame in alignment with said guideway, a pair of anvils mounted for reciprocation on said guide plate, means interconnecting said anvils and said carriage for simultaneous movement in the same linear direction, means mounted on said carriage for adjusting the cutter means relative to said anvils to adjust the angle that said cutter means makes with said anvils, and drive means operatively connected to said carriage for selectively reciprocating said carriage on said guideway while said cutter means are in cooperative shearing action with said anvils.

11. A bias cutting apparatus for cutting rubberized fabric as set forth in claim 9 wherein said linear cutting edge of said anvil defines a first line, the cutting edges of each of said cutter means defines a pair of vertical inter-secting planes, and the included angle between each of said respective planes and said first line as based on a horizontal plane defines a pair of acute angles.

12. An apparatus for the cutting of elastomeric fabric material comprising a support frame, carriage means mounted on said support frame for movement thereon, power operated means operatively connected to said carriage means for moving said carriage means on said support frame, cutter means journaled on said support means for rotation thereon, drive means mounted on said carriage and operatively connected to said cutter means for rotating said cutter means, a guide plate secured to said frame over which fabric material is adapted to travel, anvil means connected to said carriage for movement therewith, sand anvil means guided by and supported by said guide plate for cooperation with said cutter means to aid in the cutting action of fabric material supported by said guide plate, and control means connected to said cutter means for selectively moving said cutter means toward or away from said anvil means to render said cutter means operative or inoperative respectively.

* * * * *